(12) United States Patent
Smart et al.

(10) Patent No.: US 7,735,574 B2
(45) Date of Patent: Jun. 15, 2010

(54) MOTOR GRADER WITH ADJUSTABLE FRONT WHEEL STRUCTURE

(75) Inventors: William James Smart, Manjimup (AU); Edward McGugan, Holyrood (CA)

(73) Assignee: Volvo Road Machinery, Ltd., Ontario (CA)

( * ) Notice: Subject to any disclaimer, the term of this patent is extended or adjusted under 35 U.S.C. 154(b) by 778 days.

(21) Appl. No.: 11/233,373

(22) Filed: Sep. 23, 2005

(65) Prior Publication Data

US 2007/0068691 A1    Mar. 29, 2007

(51) Int. Cl.
    *E02F 3/00* (2006.01)
(52) U.S. Cl. .................. 172/799; 172/798; 172/278; 280/6.154; 280/43.17
(58) Field of Classification Search ............ 172/278, 172/178, 780–799, 1, 292, 383, 384; 280/6.154, 280/6.157, 43, 43.17, 124.111, 124.112, 280/124.117; 37/381, 382
    See application file for complete search history.

(56) References Cited

U.S. PATENT DOCUMENTS

| 1,486,436 | A | * | 3/1924 | Jones | 172/792 |
|---|---|---|---|---|---|
| 1,805,051 | A | * | 5/1931 | Schlacks | 172/789 |
| 1,837,310 | A | * | 12/1931 | Zahirniak | 172/781 |
| 1,875,778 | A | * | 9/1932 | Taylor | 280/6.154 |
| 2,195,607 | A | * | 4/1940 | Wilson et al. | 172/793 |
| 2,748,509 | A | * | 6/1956 | Brown et al. | 172/799 |
| 3,002,301 | A | * | 10/1961 | Chapman | 172/799 |
| 3,527,315 | A | * | 9/1970 | Hampton | 180/238 |
| 3,652,101 | A | * | 3/1972 | Pivonka | 280/6.154 |
| 3,976,302 | A | * | 8/1976 | Hammarstrand | 280/6.154 |
| 5,107,932 | A | * | 4/1992 | Zachman et al. | 172/4.5 |
| H1831 | H | * | 2/2000 | Kelley et al. | 180/333 |
| 6,286,606 | B1 | * | 9/2001 | Krieg et al. | 172/4.5 |
| 6,851,486 | B2 | * | 2/2005 | Marshall | 172/792 |

* cited by examiner

*Primary Examiner*—Robert E Pezzuto
*Assistant Examiner*—Matthew D Troutman
(74) *Attorney, Agent, or Firm*—B. Aaron Schulman; Stites & Harbison PLLC

(57) ABSTRACT

A motor grader has an ordinary direction of travel, has a forward end and a rearward end as defined by the ordinary direction of travel, and has two opposed sides. At least one set of front wheels is steerably mounted on the opposed sides of the motor grader adjacent the forward end, with one front wheel in each set mounted on each opposed side of the motor grader. At least one front wheel in each set of front wheels is movably mounted to the motor grader and can be selectively positioned such that each front wheel on one side of the motor grader is further away from the rearward end than the other front wheel in that set.

14 Claims, 14 Drawing Sheets

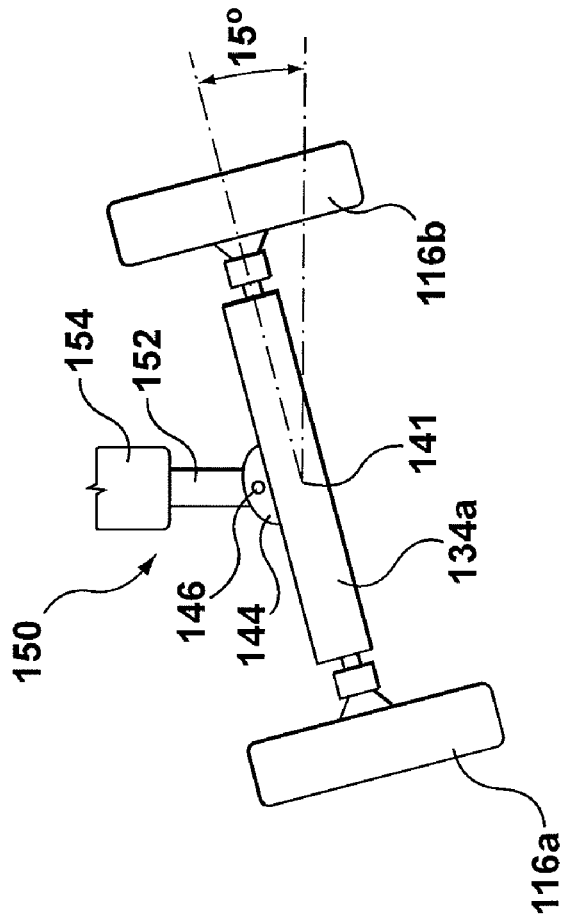
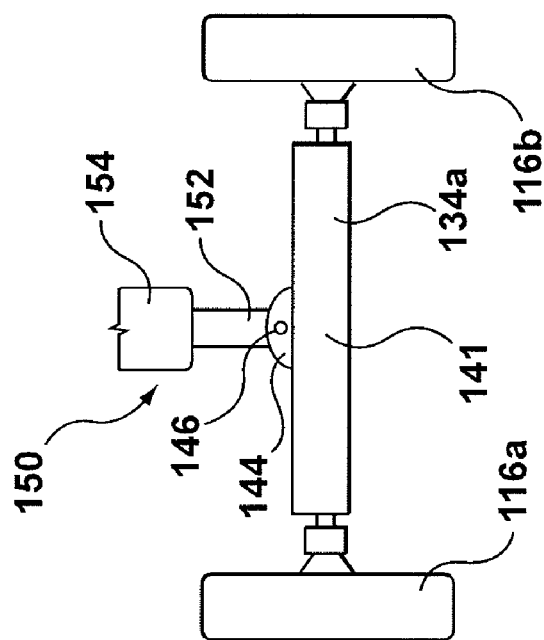
FIG. 8b
FIG. 8a

MOTOR GRADER WITH ADJUSTABLE FRONT WHEEL STRUCTURE

BACKGROUND OF THE INVENTION

The present invention relates to heavy construction equipment, and more particularly to motor graders.

A motor grader is a self-propelled vehicle having a set of front wheels, a set of rear wheels, and an adjustable ground-contacting blade or moldboard disposed between the front and rear wheels. The motor grader is carried on large rubber tires that provide good traction on most surfaces while reducing scuffing or damage to the surface, which can be more prevalent with tracked vehicles such as bulldozers.

Motor graders are used in road construction and maintenance, as well as other applications, and allow an operator to perform a wide variety of tasks. These tasks vary from smoothing rough surfaces, to contouring and shaping surfaces both directly under the machine and down and up slopes on either side of the machine. In each case, it is the grader blade that is used to effect the modifications to the work surface.

One use of motor graders is to maintain or improve the surfaces of gravel roads. In many cases such surfaces are very rough due to the existence of imperfections in the road surface such as potholes and furrows, which are physical contours produced by water soaking into the road surface rather than running off the road into the ditches, and by the impact of vehicle tires over a period of time. The furrows often seen near stop signs are thought to be the result of vehicles accelerating and braking, thus forming ridges in the road surface that can stretch from one side to the other. Where a particular gravel road is travelled by large, heavy vehicles, such as gravel trucks, the situation can be even worse, and an initially smooth gravel road can become very rough in a short period of time. This can make the roads dangerous to travel on, and can also restrict the speed of travel.

Repairing these road surfaces with a motor grader is challenging because the configuration of a conventional motor grader requires the front wheels of the grader to travel over the rough surface before the grader blade makes contact and smoothes the surface. The rear tires of the motor grader then traverse the smoothed surface.

Most motor graders are configured with two sets of rear wheels, with one set of rear wheels mounted on each side of the motor grader. Typically, each set of rear wheels will comprise two rear wheels mounted on a tandem, with one tandem being connected to each side of the motor grader so that there is one set of two rear wheels disposed on either side of the motor grader. The tandems are pivotally connected to the body of the motor grader so as to be vertically pivotable, i.e. pivotable about a horizontal axis, with the pivot point of each tandem being located between its two respective rear wheels. As a result, the tandems are free to pivot vertically when the lead wheel of a tandem contacts an imperfection in the road surface. For example, when the lead wheel of the tandem contacts a depression in the road surface, the tandem will pivot so that the lead wheel rides into the depression while the following wheel rides on the surface preceding the depression. When the lead wheel begins to exit the depression, the tandem will pivot in the opposite rotational direction so that the lead wheel rides up out of the depression while the following wheel remains in the depression. Conversely, when the lead wheel contacts a raised area, the tandem will pivot so that the lead wheel rides up onto the raised area while the following wheel remains on the relatively flat preceding surface. When the lead wheel begins to descend the raised area, the tandem will pivot in the other rotational direction so that the lead wheel rolls on the flatter surface following the raised portion while the following wheel remains on the raised area. Because of this arrangement, the motor grader itself will be vertically displaced, relative to the road surface, by only about one half the height of the road surface imperfection. This reduces by about half the effect of such road surface imperfections on the position of the motor grader itself and consequently on the grader blade.

The front wheels of the motor grader typically do not use a tandem arrangement, but instead consist of only two wheels steerably mounted at opposed ends of a front axle. The front axle is secured to the motor grader frame so that it is perpendicular to the centre line of the motor grader. As a result, where a surface imperfection is wider than the span of the front axle, both front wheels will contact the imperfection at the same time, causing the motor grader frame to displace vertically and thus moving the grader blade up and down. This limits the operator's ability to smooth a rough road surface and generally requires multiple passes or very slow operation, or both, thereby reducing productivity.

While one possible solution to the problem described above is to configure the front wheels of a motor grader in a tandem arrangement similar to that used for the rear wheels, such an arrangement would be impractical for a number of reasons. Such an arrangement would increase the cost, complexity and maintenance requirements of the motor grader, because it would require two additional tires that would have to be periodically replaced, and would also increase the complexity of the steering mechanism. In addition, using a tandem arrangement would increase the length of the grader, making it more difficult to manoeuvre.

SUMMARY OF THE INVENTION

In one aspect, the present invention is directed to a motor grader. The motor grader has an ordinary direction of travel, and has a forward end and a rearward end defined by the ordinary direction of travel. The motor grader has two opposed sides, and has at least one set of front wheels steerably mounted on the opposed sides of the motor grader adjacent the forward end. One front wheel in each set of front wheels is mounted on each opposed side of the motor grader. At least one wheel in each set of front wheels is movably mounted to the motor grader. The front wheels can be selectively positioned such that each front wheel on a selected opposed side of the motor grader is further away from the rearward end, as measured in a direction parallel to the ordinary direction of travel, than the other front wheel in that set of front wheels.

Preferably, each front wheel is movable upward and downward relative to the ordinary direction of travel in response to contours in a surface on which the motor grader is intended to operate. Also preferably, each front wheel is movable closer to and further away from the rearward end of the motor grader as measured in a direction parallel to the ordinary direction of travel. Still more preferably, the motor grader comprises a frame and a front axle, with the front axle being secured to the frame adjacent the forward end of the motor grader. The front axle preferably has opposed ends, and the front wheels are preferably secured to the front axle so that one front wheel in each set of front wheels is steerably mounted at each opposed end of the front axle. The motor grader preferably has a single set of two front wheels.

Preferably, the motor grader has a front axle that is pivotally mounted to the frame so that pivoting the front axle about a first axis moves one of the front wheels toward the rearward end of the motor grader and moves the other front wheel away from the rearward end of the motor grader, as measured in the ordinary direction of travel. Still more preferably, the front axle is further pivotable relative to the frame to permit pivotal movement about a second axis so that pivoting the front axle about the second axis causes one of the front wheels to move in a generally upward direction while causing the other front wheel to move in a generally downward direction. Both the upward and downward directions are relative to the ordinary direction of travel of the motor grader. In one preferred embodiment, the second axis is rotatable about the first axis, preferably by pivoting the front axle about the first axis. The front axle may be mounted to the frame by, for example, a ball joint, a pivot pin, or a hydraulic cylinder.

Where the front axle is mounted to the frame by a pivot pin, it is preferable that the front axle is pivotally secured to the pivot pin to permit pivotal movement of the front axle about the second axis so that pivoting the front axle about the second axis causes one of the front wheels to move in a generally upward direction while causing the other front wheel to move in a generally downward direction. Both the upward and downward directions are relative to the ordinary direction of travel of the motor grader.

Where the front axle is mounted to the frame by a hydraulic cylinder, the hydraulic cylinder preferably comprises a piston rod secured to the front axle and a barrel secured to the frame, with the piston rod being rotatable within the barrel. Preferably, the piston rod is pivotally secured to the front axle to permit pivotal movement of the front axle about the second axis so that pivoting the front axle about the second axis causes one of the front wheels to move in a generally upward direction while causing the other front wheel to move in a generally downward direction. The upward and downward directions are relative to the ordinary direction of travel of the motor grader. Alternatively, where the front axle is mounted to the frame by a hydraulic cylinder, the hydraulic cylinder may comprise a piston rod secured to the frame and a barrel secured to the front axle, with the barrel being rotatable about the piston rod. In such an alternative embodiment, the barrel is preferably pivotally secured to the front axle to permit pivotal movement of the front axle about the second axis so that pivoting the front axle about the second axis causes one of the front wheels to move in a generally upward direction while causing the other front wheel to move in a generally downward direction, in each case relative to the ordinary direction of travel of the motor grader.

Where the front axle is mounted to the frame by a hydraulic cylinder, the motor grader may also comprise a circle assembly supported by actuators that are secured to the frame and by a drawbar that is universally connected to the frame at a position adjacent the front axle. Preferably, the actuators and the hydraulic cylinder are co-operatively adjustable to adjust the orientation of the circle assembly. The motor grader may include at least one circle assembly attitude sensor and a controller. The at least one circle assembly attitude sensor is disposed on the circle assembly for transmitting at least one circle attitude signal representative of an attitude of the circle assembly. The controller is configured to receive the at least one circle attitude signal and use it to determine any adjustments of the actuators and the hydraulic cylinder required to orient the circle assembly so that the circle assembly is substantially parallel to the surface. The actuators and the hydraulic cylinder are responsive to the controller to adjust the orientation of the circle assembly so that the circle assembly is substantially parallel to a surface on, which the motor grader is intended to operate. More preferably, the motor grader also includes at least one motor grader attitude sensor for transmitting an attitude signal representative of an attitude of the motor grader. The controller is preferably configured to receive the at least one grader attitude signal and to use it to determine any adjustments of the actuators and the hydraulic cylinder required to orient the circle assembly so that the circle assembly is substantially parallel to the surface.

In another aspect, the present invention is directed to a motor grader having a frame, a front axle and front wheels steerably mounted at opposed ends of the front axle. The front axle is pivotally mounted to the frame so as to be pivotable about a first axis that is substantially perpendicular to a surface on which the motor grader is intended to operate. A pivot actuator mechanism is operably secured between the front axle and the frame for pivoting the front axle about the frame. Preferably, the front axle is further pivotable about a second axis that is perpendicular to the first axis and that is rotatable about the first axis. The front axle may be secured to the frame by, for example, a ball joint, a pivot pin or a hydraulic cylinder.

Where the front axle is secured to the frame by a pivot pin, the front axle is preferably pivotally secured to the pivot pin so that the front axle is further pivotable about the second axis, and so that the second axis is rotatable about the first axis by pivoting the front axle about the first axis.

Where the front axle is mounted to the frame by a hydraulic cylinder, the hydraulic cylinder preferably comprises a piston rod secured to the front axle and a barrel secured to the frame, with the piston rod being rotatable within the barrel. The piston rod is preferably pivotally secured to the front axle so that the front axle is pivotable about the second axis, with the second axis being rotatable relative to the first axis by pivoting the front axle about the first axis. Alternatively, where the front axle is mounted to the frame by a hydraulic cylinder, the hydraulic cylinder may comprise a piston rod secured to the frame and a barrel secured to the front axle, with the barrel being rotatable about the piston rod. In such an alternative embodiment, the barrel is preferably pivotally secured to the front axle so that the front axle is pivotable about the second axis, with the second axis being rotatable relative to the first axis by pivoting the front axle about the first axis.

Where the front axle is mounted to the frame by a hydraulic cylinder, the motor grader may further include a circle assembly supported by actuators that are secured to the frame and by a drawbar that is universally connected to the frame adjacent the front axle. The actuators and the hydraulic cylinder are preferably co-operatively adjustable to adjust the orientation of the circle assembly. The motor grader may include a controller and at least one circle assembly attitude sensor. The at least one circle assembly attitude sensor is disposed on the circle assembly for transmitting at least one circle attitude signal representative of an attitude of the circle assembly. The controller is configured to receive the at least one circle attitude signal and use it to determine any adjustments of the actuators and the hydraulic cylinder required to orient the circle assembly so that the circle assembly is substantially parallel to the surface. The actuators and the hydraulic cylinder are responsive to the controller to adjust the orientation of the circle assembly so that the circle assembly is substantially parallel to the surface. More preferably still, the motor grader also includes at least one motor grader attitude sensor for transmitting at least one grader attitude signal representative of an attitude of the motor grader to the controller. The controller is preferably configured to receive the at least one grader attitude signal and use it to determine any adjustments of the actuators and the hydraulic cylinder required to orient the circle assembly so that the circle assembly is substantially parallel to the surface.

In yet another aspect, the present invention is directed to a motor grader having a frame, a front axle, and a circle assembly that is supported by actuators that are secured to the frame and is further supported by a drawbar that is universally connected to the frame adjacent the front axle. A distance adjustment mechanism is disposed between the front axle and the frame for selectively adjusting a distance between the frame and the front axle, the distance measured in a direction that is substantially perpendicular to a surface on which the motor grader is intended to operate. The actuators and the distance adjustment mechanism are co-operatively adjustable to adjust the orientation of the circle assembly. Preferably, front wheels are steerably mounted at opposed ends of the front axle, and the distance adjustment mechanism preferably comprises a hydraulic cylinder.

The motor grader preferably includes a controller and at least one circle attitude sensor. The at least one circle attitude sensor is disposed on the circle assembly for transmitting at least one circle attitude signal representative of an attitude of the circle assembly, and the controller is configured to receive the at least one circle attitude signal and use it to determine any adjustments of the actuators and the distance adjustment mechanism required to orient the circle assembly so that the circle assembly is substantially parallel to the surface. The actuators and the distance adjustment mechanism are responsive to the controller to adjust the orientation of the circle assembly so that the circle assembly is substantially parallel to the surface. Still more preferably, the motor grader also includes at least one motor grader attitude sensor for transmitting at least one grader attitude signal representative of an attitude of the motor grader to the controller, and the controller is configured to receive the at least one grader attitude signal and use it to determine any adjustments of the actuators and the distance adjustment mechanism required to orient the circle assembly so that the circle assembly is substantially parallel to the surface.

In a still further aspect, the present invention is directed to a motor grader having a frame, a front axle having first and second opposed ends and first and second front wheels steerably mounted at the opposed ends of the front axle. The motor grader has an ordinary direction of travel and has a rearward end defined by the ordinary direction of travel. The front axle is pivotally mounted to the frame for pivotal movement about a first axis so that pivotal movement of the front axle about the first axis moves one of the front wheels toward the rearward end of the motor grader and moves the other front wheel away from the rearward end of the motor grader, as measured in the ordinary direction of travel. A pivot actuator mechanism is operably secured between the front axle and the frame for pivoting the front axle relative to the frame.

Preferably, the front axle is further pivotable relative to the frame to permit pivotal movement about a second axis so that pivoting the front axle about the second axis causes one of the front wheels to move in a generally upward direction while causing the other front wheel to move in a generally downward direction relative to the ordinary direction of travel. The upward and downward directions are measured relative to the ordinary direction of travel of the motor grader. Preferably, the second axis is rotatable about the first axis, preferably by pivoting the front axle about the first axis. The front axle may be mounted to the frame by, for example, a ball joint, a pivot pin, or a hydraulic cylinder.

Where the front axle is mounted to the frame by a pivot pin, the front axle is preferably pivotally secured to the pivot pin to permit pivotal movement of the front axle about the second axis so that pivoting the front axle about the second axis causes one of the front wheels to move in a generally upward direction while causing the other front wheel to move in a generally downward direction. Both the upward and downward directions are relative to the ordinary direction of travel. Preferably, the second axis is rotatable about the first axis by pivoting the front axle about the first axis.

Where the front axle is mounted to the frame by a hydraulic cylinder, the hydraulic cylinder preferably comprises a piston rod secured to the front axle and a barrel secured to the frame, with the piston rod being rotatable within the barrel. Preferably, the piston rod is pivotally secured to the front axle to permit pivotal movement of the front axle about the second axis so that pivoting the front axle about the second axis causes one of the front wheels to move in a generally upward direction while causing the other front wheel to move in a generally downward direction. Both the upward and downward directions are relative to the ordinary direction of travel. Preferably, the second axis is rotatable about the first axis by pivoting the front axle about the first axis. Alternatively, where the front axle is mounted to the frame by a hydraulic cylinder, the hydraulic cylinder may comprise a piston rod secured to the frame and a barrel secured to the front axle, with the barrel being rotatable about the piston rod. In such an alternate embodiment, the barrel is preferably pivotally secured to the front axle to permit pivotal movement of the front axle about the second axis so that pivoting the front axle about the second axis causes one of the front wheels to move in a generally upward direction while causing the other front wheel to move in a generally downward direction, in each case measured relative to the ordinary direction of travel.

Where the front axle is mounted to the frame by a hydraulic cylinder, the motor grader may further include a circle assembly that is supported by actuators that are secured to the frame and that is further supported by a drawbar that is universally connected to the frame at a position adjacent the front axle. Preferably, the actuators and the hydraulic cylinder are co-operatively adjustable to adjust the orientation of the circle assembly. The motor grader may include at least one circle assembly attitude sensor and a controller. The at least one circle assembly attitude sensor is disposed on the circle assembly for transmitting at least one circle attitude signal representative of an attitude of the circle assembly. The controller is configured to receive the at least one circle attitude signal and use it to determine any adjustments of the actuators and the hydraulic cylinder required to orient the circle assembly so that the circle assembly is substantially parallel to the surface. The actuators and the hydraulic cylinder are responsive to the controller to adjust the orientation of the circle assembly so that the circle assembly is substantially parallel to a surface on which the motor grader is intended to operate. More preferably, the motor grader includes at least one motor grader attitude sensor for transmitting at least one grader attitude signal representative of an attitude of the motor grader to the controller. Accordingly, the controller is preferably configured to receive the at least one grader attitude signal and use it to determine any adjustments of the actuators and the hydraulic cylinder required to orient the circle assembly so that the circle assembly is substantially parallel to the surface.

In a still further aspect, the present invention is directed to a method of operating a motor grader having a forward end and a rearward end defined by the ordinary direction of travel of the motor grader, two opposed sides and at least one set of front wheels steerably mounted on the opposed sides of the motor grader adjacent the forward end thereof, with one front wheel in each set mounted on each opposed side of the motor grader. The method includes the step of moving each front wheel on a selected opposed side of the motor grader so that each front wheel on one opposed side of the motor grader is positioned further away from the rearward end, as measured in a direction parallel to the ordinary direction of travel, than the other front wheel in that set of front wheels.

In another aspect, the present invention is directed to a method of operating a motor grader having a frame, a front axle, and a circle assembly that is supported by actuators that are secured to the frame and that is further supported by a drawbar that is universally connected to the frame adjacent the front axle. The method includes the steps of selectively adjusting a distance between the frame and the front axle, the distance measured in a direction that is substantially perpendicular to a surface on which the motor grader is intended to operate, and selectively adjusting at least one of the actuators, so as to adjust the orientation of the circle assembly.

BRIEF DESCRIPTION OF THE DRAWINGS

These and other features of the preferred embodiments of the invention will become more apparent in the following detailed description in which reference is made to the appended drawings wherein:

FIGS. 8a and 8b are a front view of the front axle of the motor grader of FIG. 5a.

DESCRIPTION OF THE PREFERRED EMBODIMENTS

In order that the invention may be more fully understood, it will now be described, by way of example, with reference to the accompanying drawings in which FIGS. 1 through 11 illustrate embodiments of the present invention.

In the description and drawings herein, and unless noted otherwise, when discussing plans of view, it will be understood that the terms "front" and "rear" shall be used to refer to the front and rear in the frontal plane. The terms "left" and "right" shall be used to refer to left and right in the lateral plane. The terms "up" and "down" shall be used to refer to up and down in the axial transverse plane.

Figure 1:
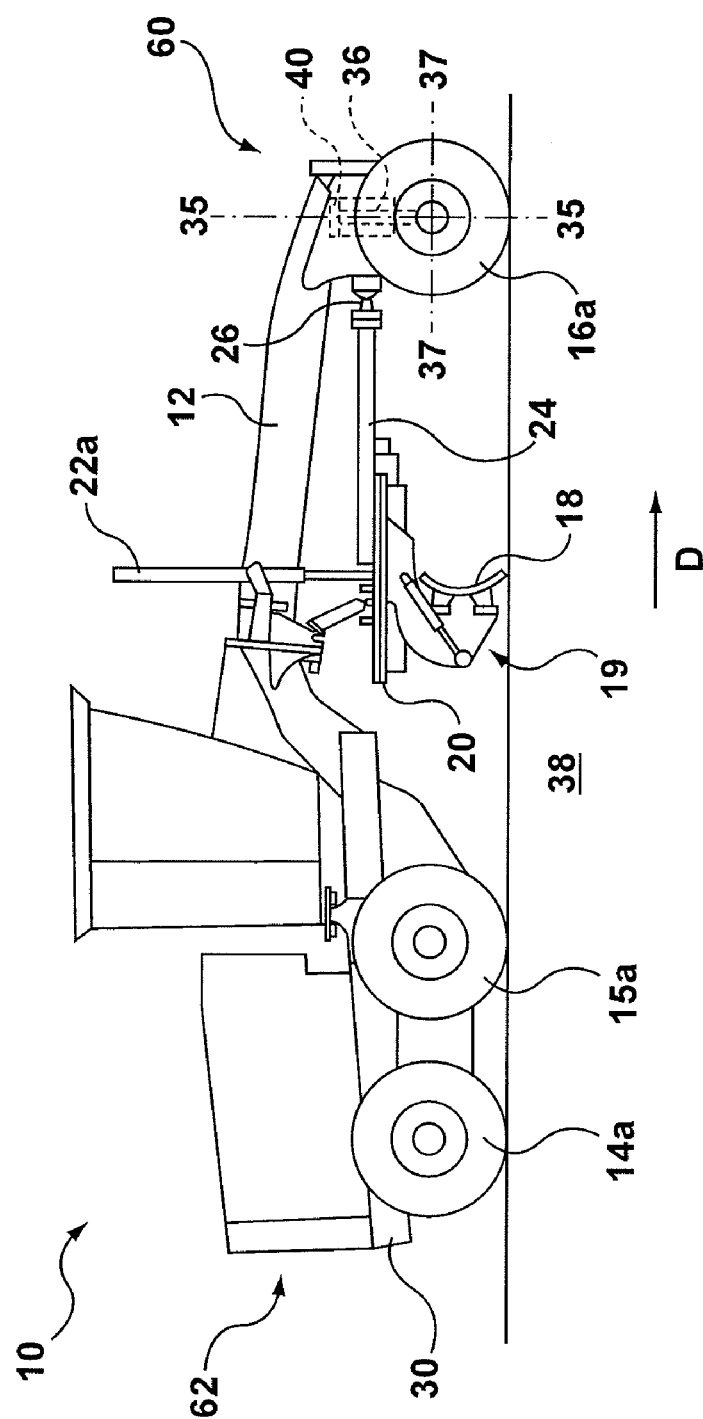
FIG. 1 is a side view of a motor grader incorporating an embodiment of the present invention.
Figure 2:
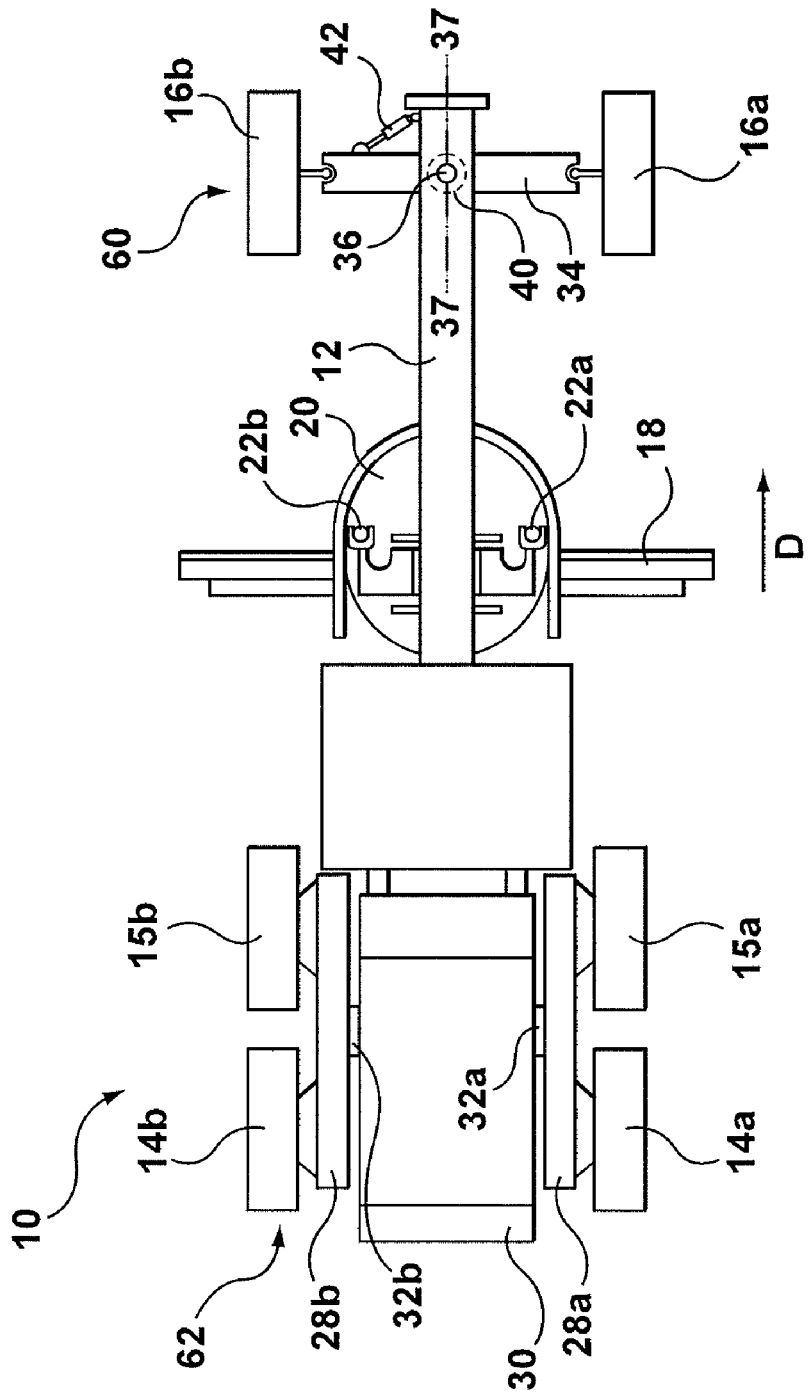
FIG. 2 is a top view of the motor grader of FIG. 1.

Now referring to FIGS. 1 and 2, an embodiment of a motor grader is shown generally at 10. The motor grader 10 has main frame 12, two sets of rear wheels 14a, 15a and 14b, 15b and a set of front wheels 16a, 16b.

Blade or moldboard 18 is mounted on blade tilt adjustment mechanism 19 supported by rotatable circle assembly 20 disposed beneath frame 12, with circle assembly 20 being supported by two blade lift actuators 22a and 22b. Circle assembly 20 is further supported by drawbar 24 connected at its rear end to circle assembly 20, and at its front end to frame 12 by way of universal connection 26 having both horizontal and vertical freedom of movement. In the embodiments shown herein, universal connection 26 is in the form of a ball joint, and it will be understood that other types of universal joint could be used. Adjustment of blade lift actuators 22a, 22b allows the height of circle assembly 20, and hence blade or moldboard 18, to be adjusted. Blade lift actuators 22a, 22b can be moved independently or in synchronization with one another.

Blade 18 can be moved or adjusted in a number of different ways so as to place it in a range of different positions. One such movement is angular adjustment of blade 18, which is accomplished by rotating circle assembly 20 beneath which blade 18 is supported. Another such adjustment is that of blade tilt. In particular, using blade tilt adjustment mechanism 19, blade 18 can be tilted forward or rearward relative to motor grader 10, depending on the operating conditions or operator preference. Specifically, referring now to FIGS. 1 and 2, motor grader 10 has forward end 60 and rearward end 62, each defined by the ordinary direction of travel of the motor grader 10 as indicated by arrow D. Tilting blade 18 forward moves the top edge of blade 18 toward forward end 60 while moving the bottom edge of blade 18 toward rearward end 62. Conversely, tilting blade 18 rearward moves the top edge of blade 18 toward rearward end 62 while moving the bottom edge of blade 18 toward forward end 60.

Rear wheels 14a, 15a are paired and are mounted on tandem 28a, and rear wheels 14b, 15b are paired and are mounted on tandem 28b, with tandems 28a, 28b being pivotally connected to body 30 of motor grader 10. As shown in FIG. 2, pivotal connection 32a, 32b of each tandem 28a, 28b to body 30 can be located between that tandem's respective two wheels 14a, 15a or 14b, 15b.

Front wheels 16a, 16b of motor grader 10 are steerably mounted at opposed ends of front axle 34. Front axle 34 is pivotally mounted to grader frame 12 by vertically arranged pivot pin 36 so that front axle 34 is pivotable about first axis 35 (see FIG. 1). First axis 35 is substantially perpendicular to surface 38 on which motor grader 10 is intended to operate, so that front axle 34 can pivot left and right relative to the ordinary direction of travel D.

A preferred embodiment of the pivotal attachment of pivot pin 36 to front axle 34 is shown in FIGS. 1, 2, 3a and 3b. The lower end of pivot pin 36 is mounted to front axle 34, and the upper portion of pivot pin 36 projects upward into receiving structure 40 that is securely mounted within frame 12 of motor grader 10. Receiving structure 40 is constructed with bushings or bearings (not shown) that allow pivot pin 36 to rotate within receiving structure 40 in grader frame 12. The top of pivot pin 36 has a cap (not shown) secured thereto to prevent pivot pin 36, and hence front axle 34, from separating from grader frame 12. Other means by which pivot pin 36 may be prevented from separating from grader frame 12 include a retaining ring received within a groove on pivot pin 36, a cross-pin perpendicular to pivot pin 36 and extending through an aperture in the top thereof, and a bearing nut arrangement. In a further alternative construction (not shown), front axle 34 may be secured to frame 12 by a ball joint.

As shown in FIG. 2, a pivot actuator mechanism in the form of axle pivot hydraulic cylinder 42 is operably secured between front axle 34 and grader frame 12 and can rotate front axle 34 about first axis 35 relative to the grader frame 12. Hydraulic cylinder 42 is universally connected, preferably by a ball joint, to both front axle 34 and grader frame 12.

Figure 3B:
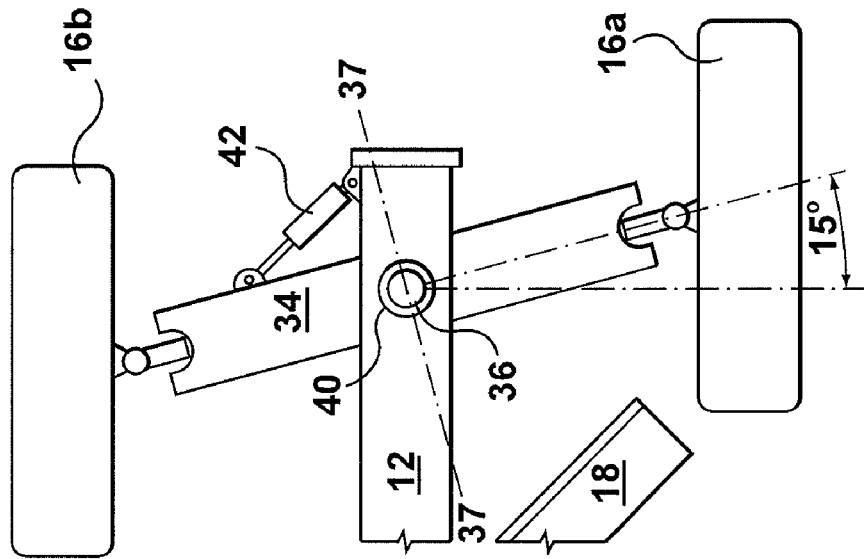
FIG. 3b is a top view of the front portion of the motor grader of FIG. 1 in a first alternate configuration.

Rotation of front axle 34 in a first rotational direction will forwardly move first front wheel 16a towards the front of motor grader 10 while rearwardly moving second front wheel 16b towards the rear of motor grader 10, as shown in FIG. 3b. Conversely, rotation of front axle 34 in a second rotational direction (not shown in the figures) will rearwardly move first front wheel 16a towards the rear of motor grader 10 while forwardly moving second front wheel 16b towards the front of motor grader 10. In FIG. 3b, rotation of front axle 34 is through a preferred range of approximately 15 degrees in each direction from a position perpendicular to grader frame 12, for a total preferred 30 degree range of rotation.

The maximum practical range of rotation of front axle 34 is limited by the steerable range of front wheels 16a, 16b. In particular, front wheels 16a, 16b must be able to turn far enough in each direction to allow motor grader 10 to be steered when front axle 34 is fully articulated (e.g. rotated approximately 15 degrees in the embodiment shown and described in FIGS. 1 through 4). Full articulation of front axle 34 by approximately 15 degrees will result in front wheels 16a, 16b being pointed 15 degrees away from ordinary direction of travel D. Thus, rotating front wheels 16a, 16b by 15 degrees in the opposite direction will align front wheels 16a, 16b with ordinary direction of travel D. In order to turn motor grader 10 in the direction opposite to that in which front axle 34 has been articulated, front wheels 16a, 16b must be able to be rotated further, that is, far enough past ordinary direction of travel D in order to effectively steer motor grader 10. Typically, the front wheels of a motor grader can be rotated approximately 50 degrees in each direction. Accordingly, where motor grader 10 is equipped with conventional steering, providing front axle 34 with a range of approximately 15 degrees rotation in each direction (i.e. forwardly or rearwardly) permits front wheels 16a, 16b to rotate 35 degrees relative to frame 12 when front axle 34 is fully articulated. It will be appreciated other ranges of articulation for front axle 34 may be used, and that if the range of rotation of front wheels 16a, 16b is increased, the range of rotation of front axle 34 can also be increased. It will be further appreciated that there is a practical limit to the range of rotation of front axle 34, in that extreme rotation will bring front axle 34 near parallel with grader frame 12 and ordinary direction of travel D, which would be detrimental to the stability of motor grader 10.

Figure 3A:
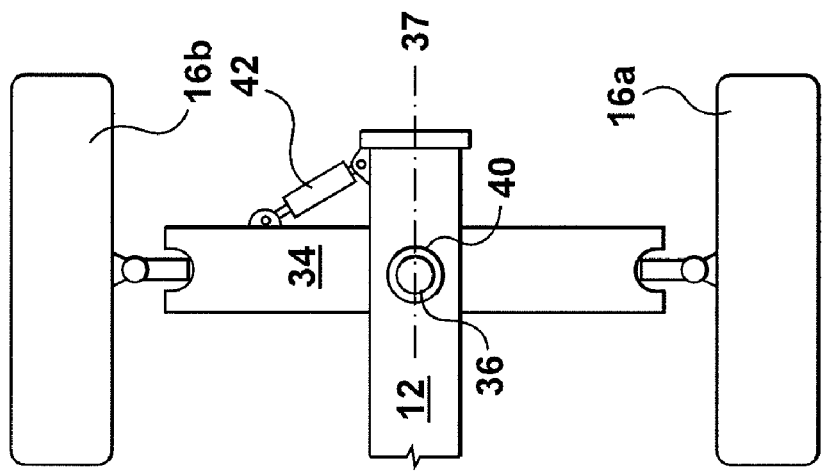
FIG. 3a is a top view of the front portion of the motor grader of FIG. 1

As shown in FIGS. 3a and 3b, the pivotal mounting of front axle 34 relative to frame 12 allows the operator to displace front wheel 16a ahead of front wheel 16b, and vice versa. As described above, because front wheels 16a, 16b are steerable relative to front axle 34, the operator is free to steer front wheels 16a, 16b so as to offset any steering effect resulting from articulation of front axle 34. Thus, the operator can maintain straight travel of motor grader 10 in direction D indicated in FIGS. 1 and 2, and can also steer motor grader 10 from side to side. In a preferred embodiment, one front wheel 16a, 16b may be moved ahead of the other by a maximum of approximately 15 inches, with such dimension infinitely adjustable by the operator from this maximum of approximately 15 inches to zero and up to approximately 15 inches in the opposite direction. This distance is based on a motor grader 10 having a front to back length of approximately 300 inches with front axle 34 having a wheel to wheel length of approximately 240 inches. For any particular motor grader 10, the distance by which one front wheel 16a, 16b may be advanced ahead of the other will depend on the dimensions of that motor grader 10.

Figure 4B:
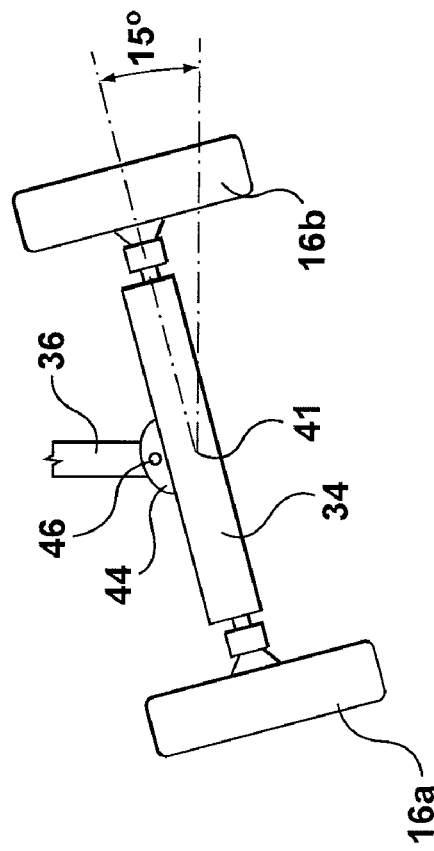
FIGS. 4a and 4b are a front view of the front axle of the motor grader of FIG. 1.
Figure 4A:
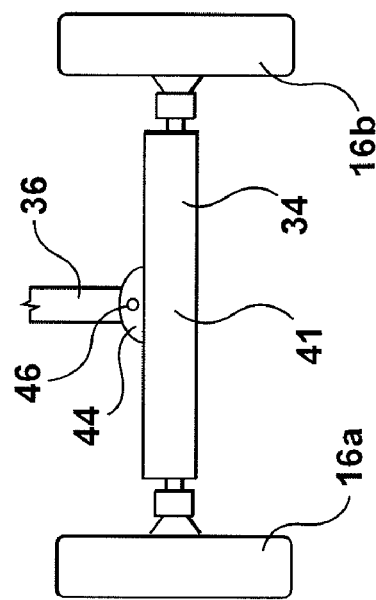

Now referring to FIGS. 4a and 4b, front axle 34 is pivotally secured to pivot pin 36 so as to be further pivotable about second axis 37 (shown in FIGS. 1, 2, 3a and 3b). Second axis 37 is perpendicular to first axis 35, that is, it is substantially parallel to surface 38 on which motor grader 10 is intended to operate. This permits front axle 34 to pivot up and down so that upward movement of front wheel 16a corresponds to downward movement of front wheel 16b, and vice versa. Second axis 37 is preferably substantially perpendicular to front axle 34, resulting in second axis 37 being rotatable about first axis 35 as front axle 34 pivots about first axis 35. Thus, the orientation of second axis 37 relative to frame 12 and direction D will depend on the position of front axle 34, as illustrated in FIGS. 3a and 3b. Referring to FIG. 3a, when front axle 34 is perpendicular to grader frame 12, second axis 37 will be aligned with frame 12 and parallel to direction D. When, as shown in FIG. 3b, front axle 34 is pivoted relative to grader frame 12 so that it is no longer perpendicular thereto, second axis 37 will be oriented so that it is no longer aligned with grader frame 12 and is non-parallel to direction D. Front axle 34 is preferably freely pivotable about second axis 37 (i.e. pivoting of front axle 34 about second axis 37 is not controlled by an actuator) so that front axle 34 can pivot up and down, as shown in FIGS. 4a and 4b, in response to contours in surface 38 on which motor grader 10 is operating. Preferably, front axle 34 can pivot up and down approximately 15 degrees in each direction.

Still referring to FIGS. 4a and 4b, an arrangement for permitting front axle 34 to pivot about second axis 37 is described. Housing 44 projects upward from front axle 34, preferably from midpoint 41 thereof, and pivot pin 36 is received within housing 44. Alternatively, housing 44 may project from a point other than midpoint 41 of front axle 34 (not shown), resulting in an asymmetrical front axle. An asymmetrical front axle may be useful in some applications. Pivot pin 36 has an elongate cylindrical aperture (not shown) that is aligned substantially horizontally relative to the substantially vertical orientation of pivot pin 36, and perpendicularly to front axle 34. This aperture contains bearings, and a securing pin 46 extends through the aperture and is secured to the housing 44 so as to pivotally secure the pivot pin 36 to the housing 44.

As noted above, in an alternative construction (not shown), front axle 34 may be secured to frame 12 by a ball joint, rather than by the combination of pivot pin 36, housing 44 and securing pin 46. In light of the foregoing discussion, it will be appreciated that a ball joint will allow front axle 34 to pivot about both first axis 35 and second axis 37.

A second embodiment of a motor grader, in which a hydraulic cylinder is substituted for the pivot pin structure used in the motor grader 10, is shown in FIGS. 5 to 8. This second embodiment is indicated generally by the reference numeral 110, and identical reference numerals are used to describe the second embodiment 110 as were used to describe the first embodiment 10, except that each reference numeral has been incremented by 100. For example, the grader frame of the second embodiment 110 corresponds to grader frame 12 of the first embodiment 10, and will be denoted by the reference numeral 112.

Figure 5A:
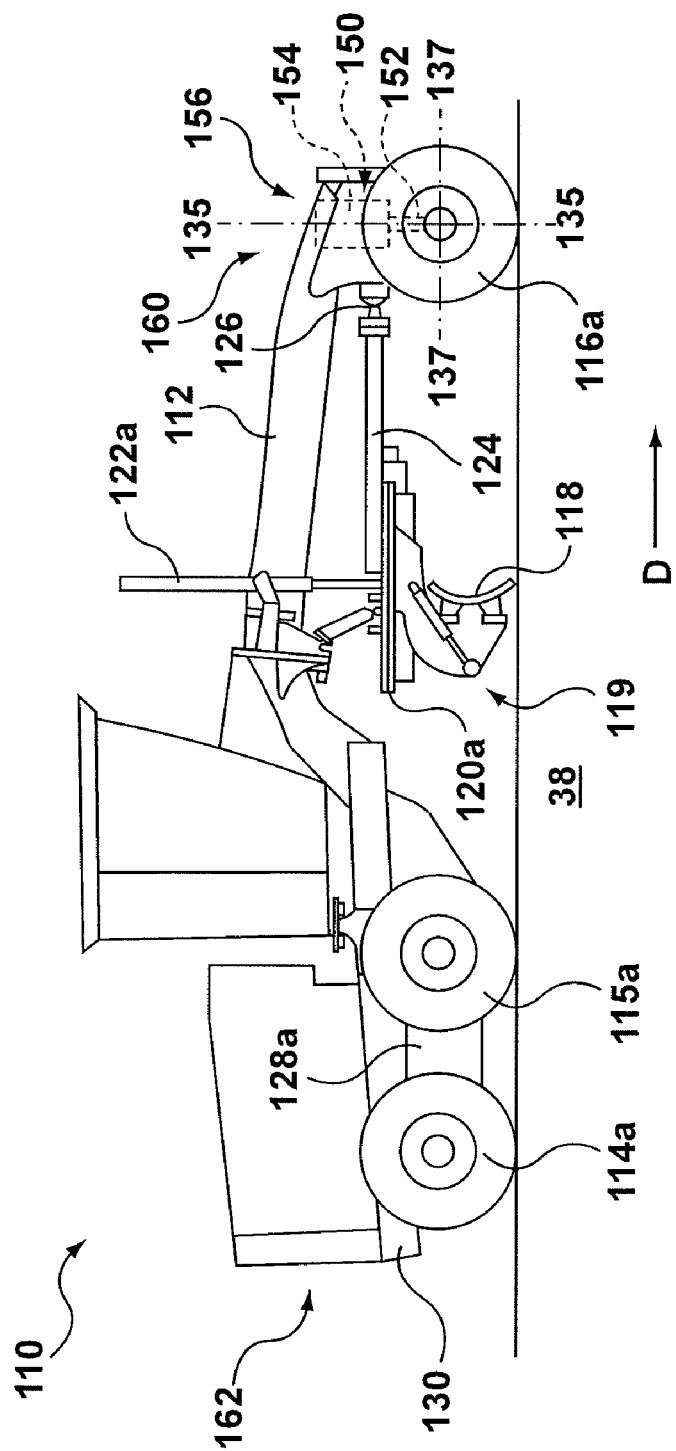
FIG. 5a is a side view of a motor grader incorporating another embodiment of the present invention.
Figure 5B:
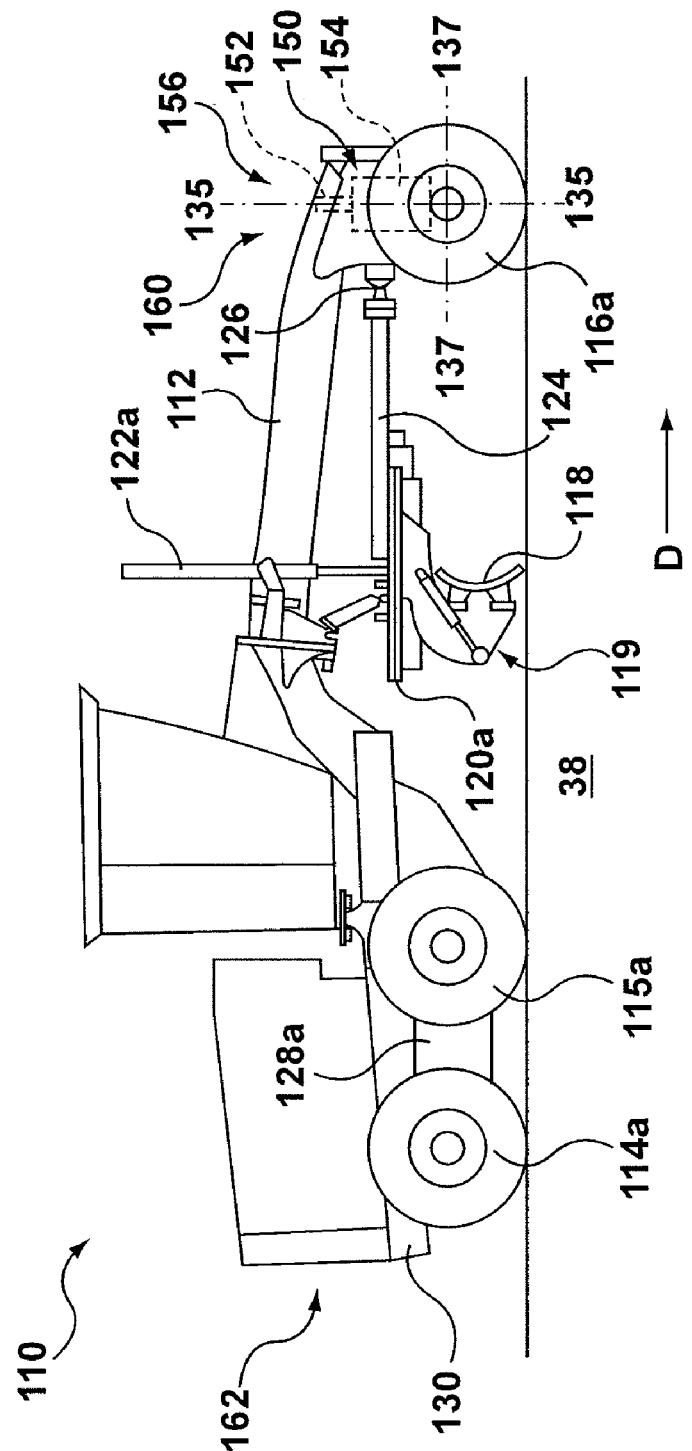
FIG. 5b illustrates a motor grader as shown in FIG. 5a, except that the orientation of hydraulic cylinder 150 relative to motor grade frame 112 and font axle 134 is reversed.
Figure 6:
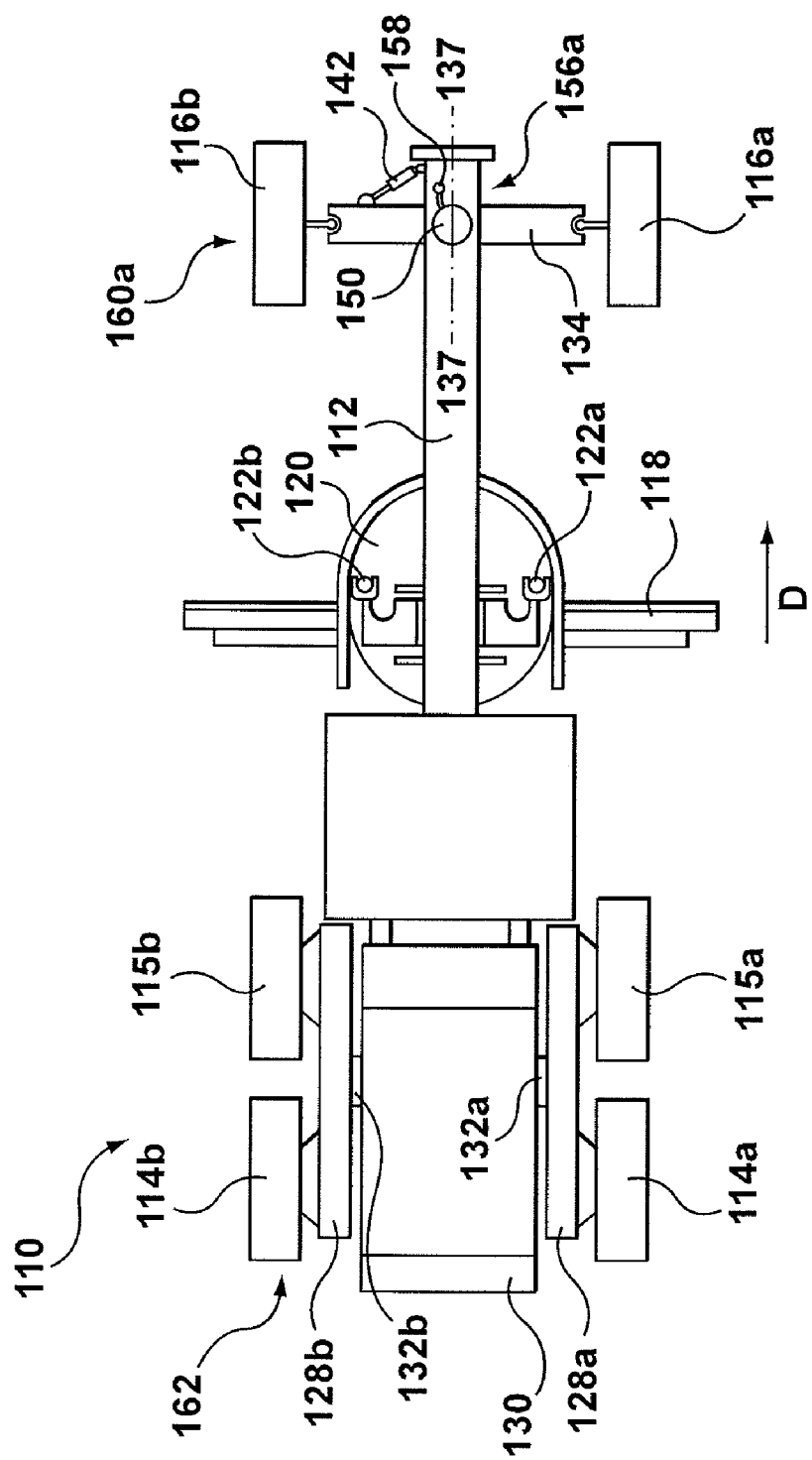
FIG. 6 is a top view of the motor grader of FIG. 5.

Now referring to FIGS. 5 and 6, front axle 134 of motor grader 110 is mounted to grader frame 112 via large diameter hydraulic cylinder 150. Hydraulic cylinder 150 comprises piston rod 152 and barrel 154 within which piston rod 152 is retained. Barrel 154 is securely mounted to frame 112 of the motor grader 110, and piston rod 152 is secured to front axle 134. Piston rod 152 is rotatable within barrel 154, and can be extended from and retracted into barrel 154. In one embodiment of motor grader 110, when hydraulic cylinder 150 is fully extended, it will raise nose 156 of motor grader 110 by approximately 600 mm relative to working surface 38. Conversely, when hydraulic cylinder 150 is retracted, it will lower nose 156 of motor grader 110.

Because piston rod 152 is rotatable within barrel 154, front axle 134 can pivot about first axis 135 relative to frame 112. A pivot actuator mechanism in the form of hydraulic cylinder 142 is universally connected to motor grader frame 112 and to front axle 134 to generate the desired pivoting of front axle 134 relative to grader frame 112 at the grader operator's discretion. As in the case where a pivot pin is used, front axle 134 is preferably pivotable through a range of approximately 15 degrees in each direction.

Figure 7B:
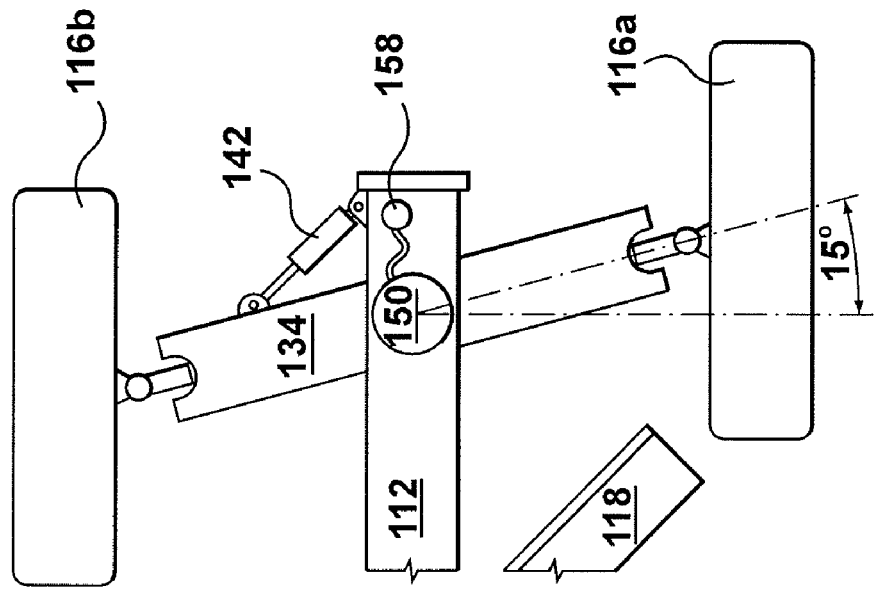
FIG. 7b is a top view of the front portion of the motor grader of FIG. 5 in an alternate configuration.
Figure 7A:
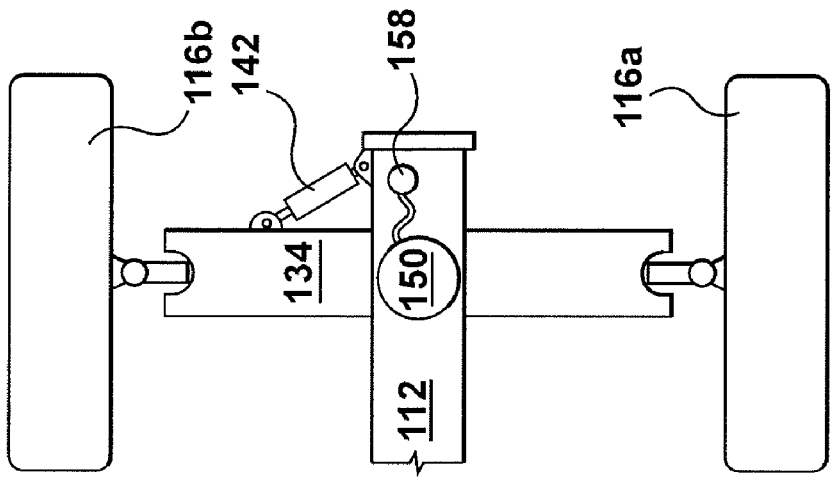
FIG. 7a is a top view of the front portion of the motor grader of FIG. 5

Referring now to FIGS. 7a and 7b, as with the embodiment using a pivot pin, the embodiment using hydraulic cylinder 150 also allows the operator to displace one front wheel 16a ahead of the other front wheel 16b, and to thereby realize the attendant advantages.

With reference now to FIGS. 8a and 8b, in a manner analogous to that described above with respect to motor grader 10, front axle 134 is pivotally secured to piston rod 152 so as to be pivotable about second axis 137. Housing 144 projects upward from midpoint 141 of front axle 134, and piston rod 152 is received within housing 144. Piston rod 152 has an elongate cylindrical aperture (not shown) aligned substantially horizontally relative to the substantially vertical orientation of piston rod 152, and substantially perpendicularly to front axle 134. Securing pin 146 extends through the aperture and is secured to housing 144 to pivotally secure piston rod 152 to housing 144.

Figure 8D:
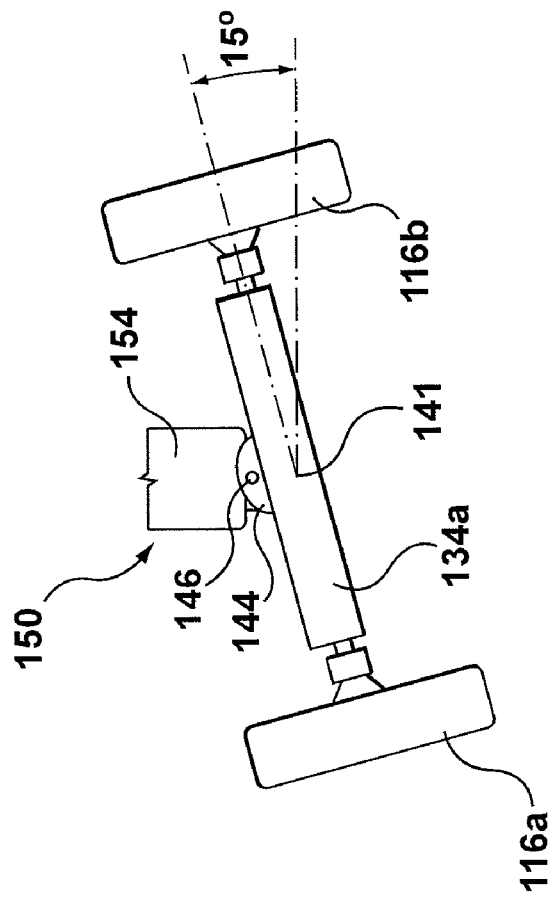
FIGS. 8c and 8d are a front view of the front axle of the motor grader of FIG. 5b.
Figure 8C:
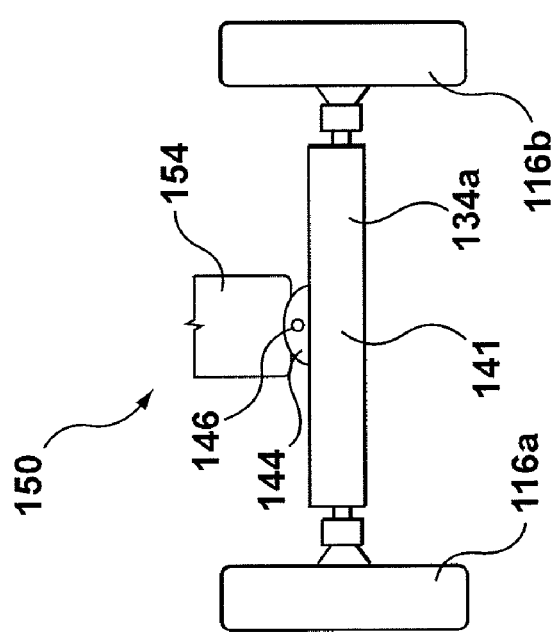

Alternatively (as illustrated in FIGS. 5b, 8c and 8d), the orientation of hydraulic cylinder 150 relative to motor grader frame 112 and front axle 134 may be reversed so that barrel 154 is secured to front axle 134, and piston rod 152 is secured to motor grader frame 112. In such an alternative arrangement, barrel 154 would be pivotable about piston rod 152, and front axle 134 would preferably be pivotally secured to barrel 154 so that front axle 134 would be pivotable about second axis 137.

Advantages common to both motor grader 10 and motor grader 110 will now be described. For ease of reference, the description of the common advantages is made with respect to motor grader 10 only, and it will be understood that both the description and the advantages themselves are also applicable, mutatis mutandis, to motor grader 110. In particular, it is to be appreciated that the described advantages flow from the common features of motor graders 10 and 110, including, but in no way limited to, the fact that front axles 34, 134 may be pivoted about first axes 37, 137, respectively.

As noted above, in conventional motor graders the front axle is perpendicular to the frame. As a result, when a conventional motor grader encounters imperfections in a working surface, such as corrugations or elongated potholes that are perpendicular to the direction of travel, the frame of the motor grader, and hence the blade, may be displaced. Specifically, as the front wheels of a conventional motor grader descend into an elongate pothole or corrugation, the distance between the grader frame and the working surface is reduced. Where a corrugation or elongate pothole is transverse to the ordinary direction of travel of a conventional motor grader, both front wheels will enter the pothole simultaneously, resulting in a vertical displacement of the front wheels, and therefore the front axle, equal to the depth of the pothole. Because the motor grader's front axle supports the frame, and the motor grader's frame supports the blade, this displacement moves the blade closer to the ground. If the pothole or corrugation is large enough, the operator may have to stop the motor grader to adjust the blade position, which would result in reduced productivity. Motor graders constructed according to an aspect of the present invention, however, can obviate these difficulties because the operator can articulate front axle 34 (i.e. rotate it about first axis 35) to position one wheel 16a, 16b ahead of the other.

Figure 9A:
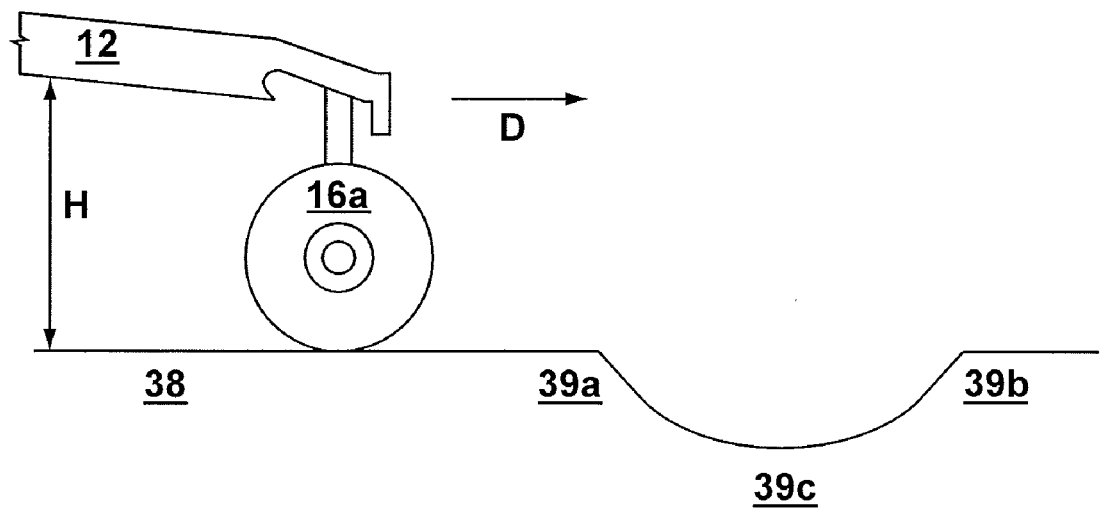
FIG. 9a is a side view of the front portion of the motor grader of FIG. 1 and FIGS. 9b to 9d are side views of the front portion of the motor grader of FIG. 1 in a second alternate configuration.

Referring now to FIG. 9a, a side view of the front portion of grader 10 is shown with front axle 34 configured so that it is perpendicular to direction of travel D, which is identical to the configuration shown in FIG. 3a. Frame 12 of motor grader 10 is disposed a distance H above surface 38, with distance H being measured along a notional line that is perpendicular to working surface 38 from an arbitrary fixed point on motor grader frame 12 to a corresponding point on working surface 38. As can be seen in FIG. 9a, motor grader 10 is approaching an elongate pothole 39 that is transverse to direction of travel D, and which comprises first "crest" 39a, second "crest" 39b, and "dip" 39c.

Figure 9B:
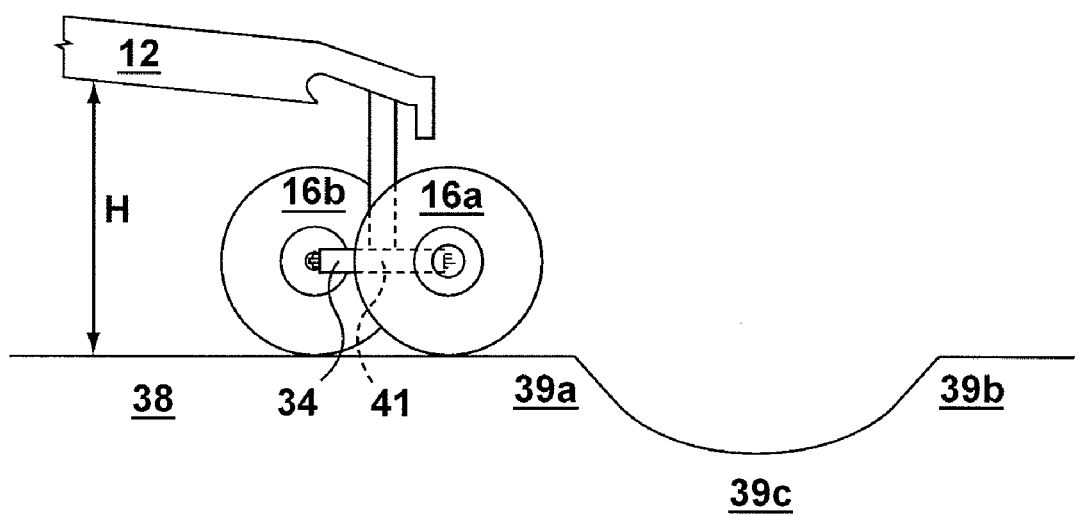

Now referring to FIG. 9b, upon seeing the elongate pothole 39, the operator would adjust the articulation of front axle 34 so that front wheel 16a is positioned forward of front wheel 16b. The precise amount of articulation can be varied depending on the size of pothole 39. Still referring to FIG. 9b, it can be seen that frame 12 of motor grader 10 is still the same distance H above surface 38, as articulation of front axle 34 does not significantly affect the vertical position of motor grader frame 12.

Figure 9C:
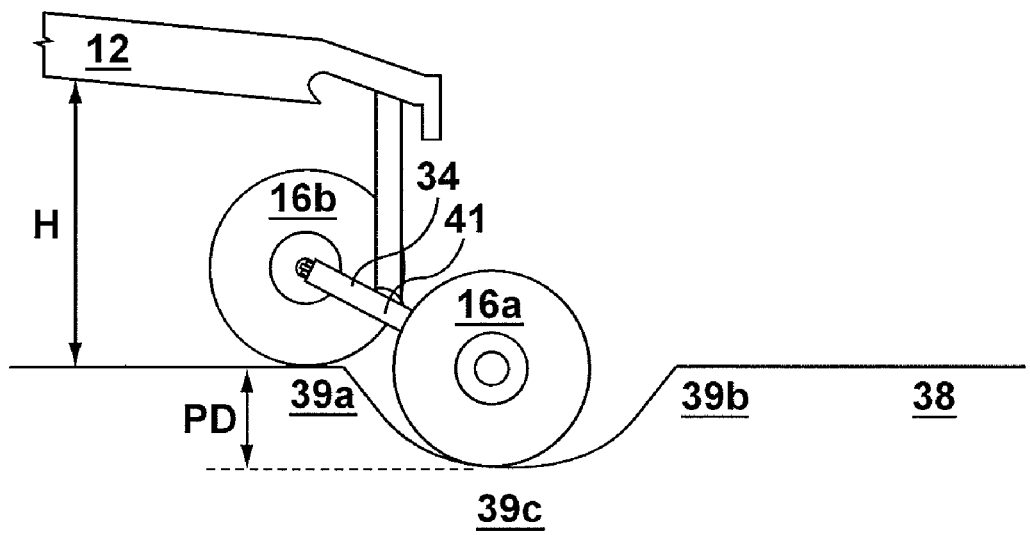
Figure 9D:
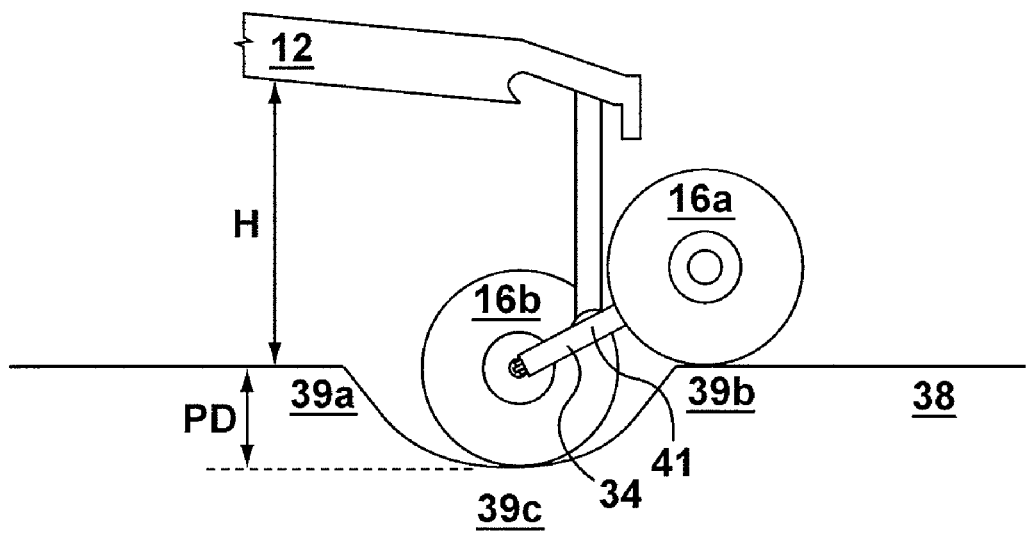

With reference now to FIG. 9c, because front axle 34 is pivotable about second axis 37, when leading wheel 16a encounters "dip" 39c of pothole 39, trailing wheel 16b will be situated on first "crest" 39a. Similarly, as shown in FIG. 9d, when leading wheel 16a ascends onto second "crest" 39b, trailing wheel 16b will be situated within the "dip" 39c. Thus, front wheels 16a, 16b proceed down into and up out of pothole 39 sequentially rather than simultaneously, with pivotal movement of front axle 34 about second axis 37 assisting in maintaining motor grader 10 level relative to surface 38. This provides an arrangement on front axle 34 analogous to that provided by rear tandems 28. In particular, even though each front wheel 16a, 16b is displaced by a distance PD equal to the depth of pothole 39, because front wheels 16a, 16b do not descend into pothole 39 simultaneously, midpoint 41 of front axle 34 is displaced only by approximately one half of the distance PD. Because grader frame 12 is secured to midpoint 41 of front axle 34, the distance H between grader frame 12 and working surface 12 is also reduced by only about one half of the distance PD. This increases the stability of the blade 18 (which is supported by circle assembly 19 which is in turn supported by grader frame 12) and reduces the vertical displacement of the blade 18 by approximately half when motor grader 10 travels over a rough working surface 38. Motor grader 10 may therefore require fewer passes to produce a smooth surface, and may also be able to operate at higher speeds in certain instances, thereby potentially making motor grader 10 and its operator more productive.

Hydraulic cylinder 42, when not actuated, will have a fixed length. Accordingly, at any articulation angle, pivotal motion of front axle 34 about second axis 37, for example in response to pothole 39, will also result in some rotation of front axle 34 about first axis 35 in order to accommodate the fixed length of hydraulic cylinder 42. However, such rotation about first axis 35 is small relative to the rotation about second axis 37 (e.g. front axle 34 may rotate 1 to 3 degrees about first axis 35 when rotating 15 degrees about second axis 37) and generally does not appreciably affect operation of motor grader 10. If desired, computer control can be used to obviate this effect. In particular, motor grader 10 may be provided with sensors to detect the degree of rotation of front axle 34 about second axis 37. Such sensors would transmit this data to a controller, which would use that data to adjust the length of hydraulic cylinder 42 so as to compensate for the rotation of front axle 34 about second axis 37 and inhibit rotation of front axle 34 about first axis 35. As indicated above, this description applies equally, mutatis mutandis, to motor grader 110 and to the interaction among hydraulic cylinder 142, front axle 134 and motor grader frame 112 thereof.

The articulation of front axle 34, 134 also provides motor graders 10, 110 with a further functional advantage (again, only motor grader 10 is explicitly described).

In certain situations it is advantageous to be able to rotate circle assembly 20 of motor grader 10 so that blade 18 is at a very sharp angle relative to frame 12 and the projected width of blade 18 is very small. This allows motor grader 10 to smooth a very narrow working surface 38, such as a road shoulder that is situated between a paved road and a guard rail. In a motor grader in which the front axle could not be articulated, the range of such angling of the grader blade would be limited by the potential of contact between the grader blade and one of the front wheels. In the case of motor grader 10, the operator can articulate front axle 34 so that front wheel 16*a* that would otherwise be hit by blade 18 is positioned away from blade 18. This allows blade 18 to be positioned at a sharper angle, as shown in FIG. 3*b*. This makes it possible to grade a narrower road or shoulder surface than is possible with a grader not configured with front axle articulation.

Providing motor graders 10, 110 with an articulable front axle 34, 134, respectively, provides still another functional advantage (once again, the description is with respect to motor grader 10).

Motor graders are typically long machines, and turning sharp corners in a motor grader can present a serious challenge to an operator, especially when operating on congested roads or in urban settings with narrow roads. Because front wheels 16*a*, 16*b* are independently steerable relative to front axle 34, an operator can articulate front axle 34 and turn front wheels 16*a*, 16*b* in the same direction, significantly reducing the turning radius of motor grader 10 and allowing motor grader 10 to negotiate sharper corners.

As noted above, it is to be understood that the above-described advantages are common to both motor grader 10 and motor grader 110. Accordingly, while these common advantages were described with respect to motor grader 10, both the description and the advantages themselves also apply, mutatis mutandis, to motor grader 110.

In addition to the advantages described above that are common to motor grader 10 and motor grader 110, motor grader 110 also has additional advantages that motor grader 10 does not possess. These additional advantages are now described.

Referring again to FIGS. 5 and 6, large diameter hydraulic cylinder 150 is configured with hydraulic oil accumulator 158 in the circuit that controls extension and retraction of cylinder 150. Accumulator 158 is pre-charged with an inert gas as is known in the art so that the circuit containing accumulator 158 and hydraulic cylinder 150 will provide a shock absorbing and dampening effect on forward end 160 of motor grader 110. Thus, when grading rough work surfaces, motor grader frame 112 and by extension grader blade 118 will be somewhat isolated from work surface 38, resulting in less unwanted vertical displacement of the grader blade 118. This may permit the operator to produce a smoother surface at higher speed, and may also provide the operator with a smoother ride, both of which may improve the operator's productivity and efficiency.

A motor grader is normally designed so that the circle assembly of the grader will be parallel to the work surface 38 when the lower edge of the blade is resting on the work surface. This allows the operator to rotate the circle assembly and thus change the angle of the blade without having to adjust the position of the blade lift actuators to keep the lower edge of the blade from either cutting into or rising above the work surface. If the circle assembly is not level with the working surface, the grader becomes more difficult to operate, since additional simultaneous adjustments, such as to the position of the blade lift actuators, must be made by the operator to maintain the appropriate blade position.

As indicated above, blade tilt adjustment mechanism 119 can be used to tilt blade 118, and the terms "tilt" and "tilted" refer to blade 118 being pivoted about a substantially horizontal axis so that the upper edge of blade 118 moves toward or away from front end 160 of motor grader 110 while the lower edge of blade 118 simultaneously moves in the opposite direction. Because of the geometry of blade tilt adjustment mechanism 119, tilting of blade 118 causes the lower edge of blade 118 to move vertically. Specifically, if blade 118 is tilted forward (the upper edge moved toward forward end 160 of motor grader 110), the lower edge of blade 118 moves downward. If blade 118 is tilted rearward (the upper edge moved toward rearward end 162 of motor grader 110), the lower edge of blade 118 moves upward. Accordingly, when the operator adjusts the tilt of blade 118 for specific operating conditions, the height of blade 118 relative to surface 38 changes, necessitating adjustments if the lower edge of blade 118 is to remain in contact with work surface 38.

As with motor grader 10, circle assembly 120 of motor grader 110 is supported by drawbar 124, as shown in FIG. 6. Analogously to motor grader 10, drawbar 124 is connected at one end to circle assembly 120, and at the other to frame 112 by way of universal connection 126, typically in the form of a ball joint or other universal joint having both horizontal and vertical freedom of movement. Because the vertical position of universal connection 126 is fixed relative to work surface 38, raising or lowering circle assembly 120 will pivot drawbar 124 about universal connection 126, thereby tilting circle assembly 120 so that it is no longer be parallel to work surface 38.

The operator can vary the length of hydraulic cylinder 150 to raise or lower the front of motor grader frame 112 relative to front axle 134 and hence relative to surface 38. Because universal connection 126 is mounted to motor grader frame 112 toward forward end 160 of motor grader 110, when nose 156 of motor grader frame 112 is raised or lowered, the forward end of drawbar 124 is also raised or lowered. This raising or lowering of the forward end of drawbar 124 affects the angle of circle assembly 120 relative to surface 38. Thus, if circle assembly 120 is moved away from the parallel position, the operator can adjust the height of nose 156 of motor grader frame 112 to bring circle assembly 120 back to the parallel position. Thus, blade lift actuators 122*a*, 122*b* and hydraulic cylinder 150 are co-operatively adjustable to orient circle assembly 120 so that circle assembly 120 is substantially parallel to surface 38.

Figure 10:
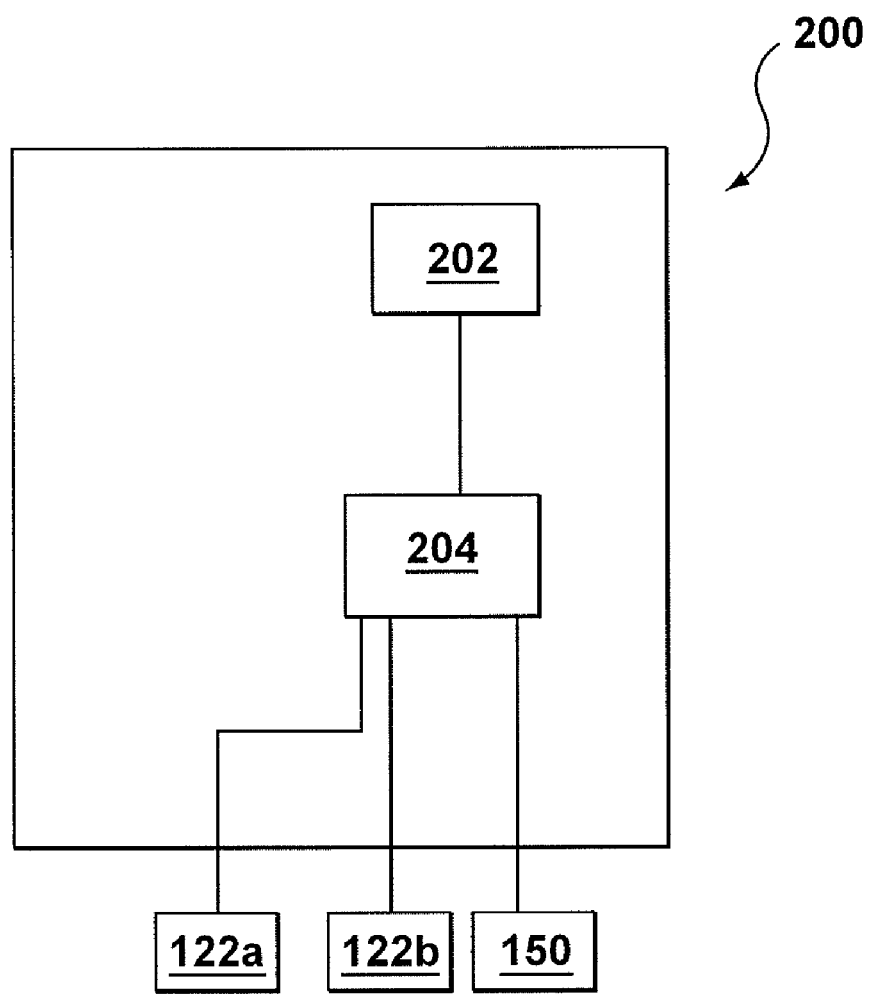
FIG. 10 is a block diagram of a first system for maintaining a circle assembly of a motor grader substantially parallel to a surface on which the motor grader is intended to operate.
Figure 11:
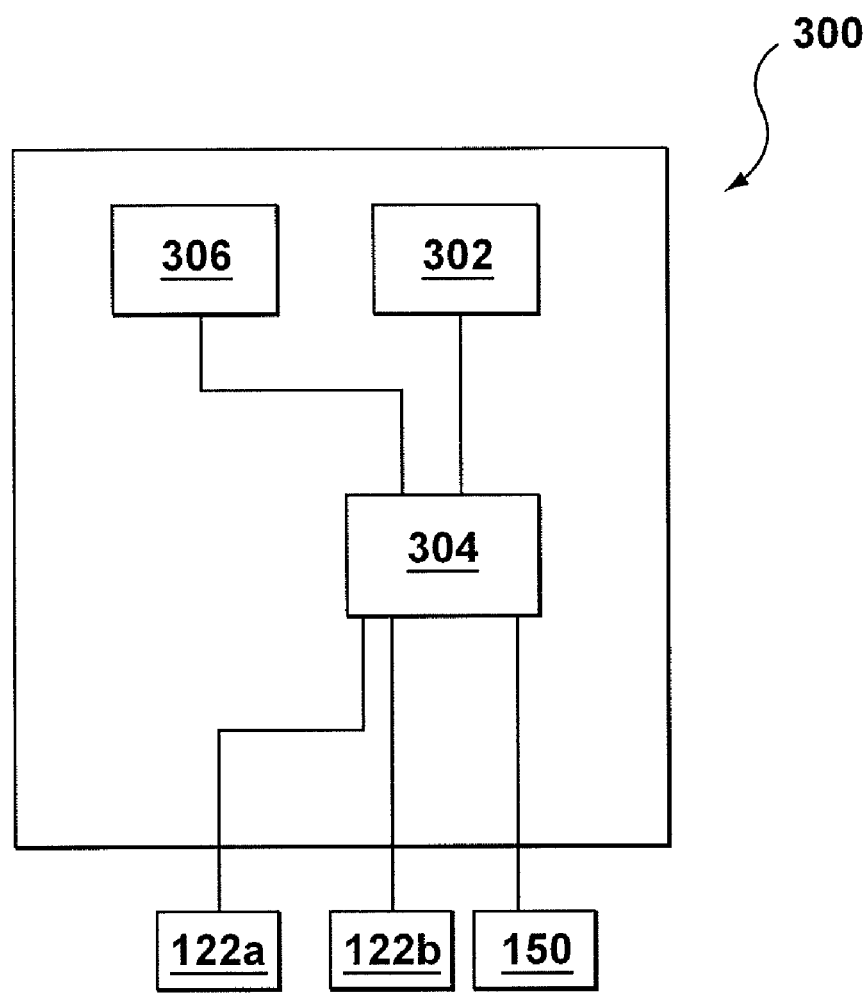
FIG. 11 is a block diagram of a second system for maintaining a circle assembly of a motor grader substantially parallel to a surface on which the motor grader is intended to operate.

A motor grader 110 may be provided with a system 200 for automatically maintaining the orientation of circle assembly 120 parallel to surface 38. With reference now to FIG. 10, system 200 comprises one or more circle attitude sensors 202, and controller 204. Circle attitude sensor(s) 202 are disposed on circle assembly 120, and can sense the angle of circle assembly 120 and transmit a signal representative of the attitude of circle assembly 120 to controller 204. Controller 204 will use the signal(s) as input to determine if any adjustments of blade lift actuators 122a, 122b and hydraulic cylinder 150 are required to orient circle assembly 120 so that it is substantially parallel to surface 38. Blade lift actuators 122a, 122b and hydraulic cylinder 150 are responsive to controller 204 to adjust the orientation of circle assembly 120. System 200 will operate satisfactorily where a motor grader is operating on a generally flat surface.

Where it is desired to use motor grader 110 on a surface that includes hills, valleys or other significant inclines, problems may be encountered in using system 200. In particular, where motor grader 110 is operating on an incline, circle attitude sensors 202 may detect the incline itself and transmit a signal indicating, incorrectly, that circle assembly 120 is not oriented parallel to surface 38. Accordingly, it is preferred to use modified system 300 shown in FIG. 11.

System 300 includes one or more circle attitude sensors 302 (analogous to circle attitude sensors 202), controller 304, as well as one or more grader attitude sensors 306 that transmit a signal representative of the attitude of motor grader 110 to controller 304. Grader attitude sensor(s) 306 may be mounted on grader frame 112, grader body 130, or at any other suitable position on motor grader 110 that will not be affected by movement of circle assembly 120 or any related actuators. By using the attitude signal(s) from grader attitude sensors 306 as additional input, controller 304 can compensate for the effect of surface incline on the signal transmitted by circle attitude sensor(s) 302. For example, controller 304 may treat the input from grader attitude sensor(s) 306 as indicative of the planar slope of surface 38 on which motor grader 110 is operating. Accordingly, controller 304 would direct blade lift actuators 122a, 122b and hydraulic cylinder 150 to adjust the orientation of circle assembly 120 so that the input received from circle attitude sensor(s) 302 corresponds to that received from grader attitude sensor(s) 306.

As described above, hydraulic cylinder 150 serves as a distance adjustment mechanism disposed between front axle 134 and grader frame 112, allowing an operator to selectively adjust the distance, measured in a direction perpendicular to surface 38 on which motor grader 110 is intended to operate. Moreover, blade lift actuators 122a, 122b and hydraulic cylinder 150 are co-operatively adjustable to orient circle assembly 120 so that it is substantially parallel to surface 38.

Other distance adjustment mechanisms may be substituted for hydraulic cylinder 150, and it is not necessary that a motor grader having such an adjustment mechanism also have a front axle that is pivotable relative to the grader frame. By way of example only, hydraulic cylinder 150 could be replaced with a screw-driven height adjustment mechanism or a gearwheel-and-ratchet height adjustment mechanism.

In the embodiments described above, front axle 34, 134 is pivotally mounted to grader frame 12, 112, respectively and hydraulic cylinder 42, 142 is operably secured between front axle 34, 134 and grader frame 12, 112, respectively. Actuating hydraulic cylinder 42, 142 causes pivotal movement of front axle 34, 134 relative to the frame 12, 112. This pivotal movement of front axle 34, 134 moves one front wheel 16a, 16b or 116a, 116b toward rearward end 62, 162 of motor grader 10, 110 while moving the other front wheel 16a, 16b or 116a, 116b away from rearward end 62, 162 of motor grader 10, 110. Thus, the purpose of the pivotal mounting of front axle 34, 134 is to permit the desired movement of front wheels 16a, 16b or 116a, 116b. Specifically, front wheels 16a, 16b or 116a, 116b are moveably mounted at opposed sides of motor grader 10, 110 by way of front axle 34, 134 so that a front wheel 16a, 16b or 116a, 116b on one side of motor grader 10, 110 can be moved toward rearward end 62, 162 while the front wheel 16a, 16b or 116a, 116b on the other side of the motor grader 10, 110 is moved away from the rearward end 62, 162.

It is contemplated, however, that other means of achieving the forward and rearward movement of front wheels 16a, 16b or 116a, 116b, other than a pivotally mounted front axle 34, 134, may be employed without departing from the scope of the present invention. By way of example only, a motor grader could be provided with a front axle that does not pivot about first axis 35. Such a motor grader could be further provided with opposed front wheels that are movably mounted to the front axle so that they can be selectively moved toward and away from the rearward end of the motor grader. It is also envisioned that more than one front wheel may be mounted on each opposed side of the motor grader. For example, two front wheels may be mounted on a tandem, with one tandem on each side of the motor grader. Thus, there would be a total of four front wheels consisting of two sets of two front wheels, with one front wheel in each set mounted on each opposed side of the motor grader. The tandems could then be movably mounted to the motor grader so that the tandems could be selectively positioned such that the tandem on one side of the motor grader is further away from the rearward end than the tandem on the other side of the motor grader. Thus, the front wheels would be selectively positionable such that each front wheel on one side of the motor grader is further away from the rearward end, as measured in a direction parallel to the ordinary direction of travel, than the other front wheel in that set of front wheels.

It is also envisioned that only one wheel, or only one tandem, is movably mounted to the motor grader. Such a wheel or tandem would be movable both toward and away from the rearward end so as to permit the desired relative positioning of the front wheels.

Accordingly, although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A motor grader having a frame, a front axle having first and second opposed ends and first and second front wheels steerably mounted at the opposed ends of the front axle, the motor grader having an ordinary direction of travel and having a rearward end defined by the ordinary direction of travel, wherein the front axle is pivotally mounted to the frame by a distance adjustment mechanism, the distance adjustment mechanism having a first member and a second member telescopically retained within the first member, telescopic movement of the second member relative to the first member varying distance between the front axle and the frame, the second member being rotatable within the first member about a first axis and rotation of the second member about the first axis permitting pivotal movement of the front axle about the first axis that moves one of the front wheels toward the rearward end of the motor grader as measured in a direction parallel to the ordinary direction of travel and moves the other front wheel away from the rearward end of the motor grader as measured in the ordinary direction of travel, the front axle is further pivotable about a second axis, the second axis being substantially perpendicular to a transverse direction defined by the front axle and substantially perpendicular to the first axis;

a pivot actuator mechanism is operably secured between the front axle and the frame for pivoting the front axle relative to the frame; and wherein each of said first and second front wheels steerably mounted at the opposed ends of the front axle is steerable relative to the front axle about a respective steering axis spaced from the first axis.

2. The motor grader of claim 1 wherein pivoting the front axle about the second axis causes one of the front wheels to move in a generally upward direction relative to the ordinary direction of travel while causing the other front wheel to move in a generally downward direction relative to the ordinary direction of travel.

3. The motor grader of claim 1 wherein the second axis is rotatable about the first axis by pivoting the front axle about the first axis.

4. The motor grader of claim 1 wherein the distance adjustment mechanism is mounted to the frame front axle by a ball joint.

5. The motor grader of claim 1 wherein the distance adjustment mechanism is mounted to the front axle by a pivot pin.

6. The motor grader of claim 5 wherein the front axle is pivotally secured to the pivot pin to permit pivotal movement of the front axle about the second axis so that pivoting the front axle about the second axis causes one of the front wheels to move in a generally upward direction relative to the ordinary direction of travel while causing the other front wheel to move in a generally downward direction relative to the ordinary direction of travel, and wherein the second axis is rotatable about the first axis by pivoting the front axle about the first axis.

7. The motor grader of claim 1 wherein the distance adjustment mechanism is a hydraulic cylinder, the first member is a barrel of the hydraulic cylinder and the second member is a piston rod of the hydraulic cylinder.

8. The motor grader of claim 7 wherein the barrel is secured to the frame, and the piston rod is secured to the front axle.

9. The motor grader of claim 8 wherein the piston rod is pivotally secured to the front axle to permit pivotal movement of the front axle about the second axis so that pivoting the front axle about the second axis causes one of the front wheels to move in a generally upward direction relative to the ordinary direction of travel while causing the other front wheel to move in a generally downward direction relative to the ordinary direction of travel, and wherein the second axis is rotatable about the first axis by pivoting the front axle about the first axis.

10. The motor grader of claim 7 wherein the piston rod is secured to the frame, and the barrel is secured to the front axle.

11. The motor grader of claim 10 wherein the barrel is pivotally secured to the front axle to permit pivotal movement of the front axle about the second axis so that pivoting the front axle about the second axis causes one of the front wheels to move in a generally upward direction relative to the ordinary direction of travel while causing the other front wheel to move in a generally downward direction relative to the ordinary direction of travel, and wherein the second axis is rotatable about the first axis by pivoting the front axle about the first axis.

12. The motor grader of claim 1, further comprising a circle assembly, the circle assembly supported by actuators that are secured to the frame, the circle assembly further supported by a drawbar that is universally connected to the frame at a position adjacent the front axle, wherein the actuators and the distance adjustment mechanism are co-operatively adjustable to adjust the orientation of the circle assembly.

13. The motor grader of claim 12, the motor grader further comprising at least one circle assembly attitude sensor, the at least one circle assembly attitude sensor disposed on the circle assembly for transmitting at least one circle attitude signal representative of an attitude of the circle assembly; and a controller configured to receive the at least one circle attitude signal and to use the at least one circle attitude signal to determine any adjustments of the actuators and the hydraulic cylinder required to orient the circle assembly so that the circle assembly is substantially parallel to the surface;

wherein the actuators and the distance adjustment mechanism are responsive to the controller to adjust the orientation of the circle assembly so that the circle assembly is substantially parallel to a surface on which the motor grader is intended to operate.

14. The motor grader of claim 13, further comprising at least one motor grader attitude sensor for transmitting at least one grader attitude signal representative of an attitude of the motor grader to the controller and wherein the controller is configured to receive the at least one grader attitude signal from the at least one motor grader attitude sensor and to use the at least one grader attitude signal to determine any adjustments of the actuators and the distance adjustment mechanism required to orient the circle assembly so that the circle assembly is substantially parallel to the surface.

* * * * *